July 10, 1956 D. P. HARRIS 2,753,726
SEMI-AUTOMATIC HYDRAULIC GEAR CHANGE MECHANISMS
Filed Dec. 11, 1953
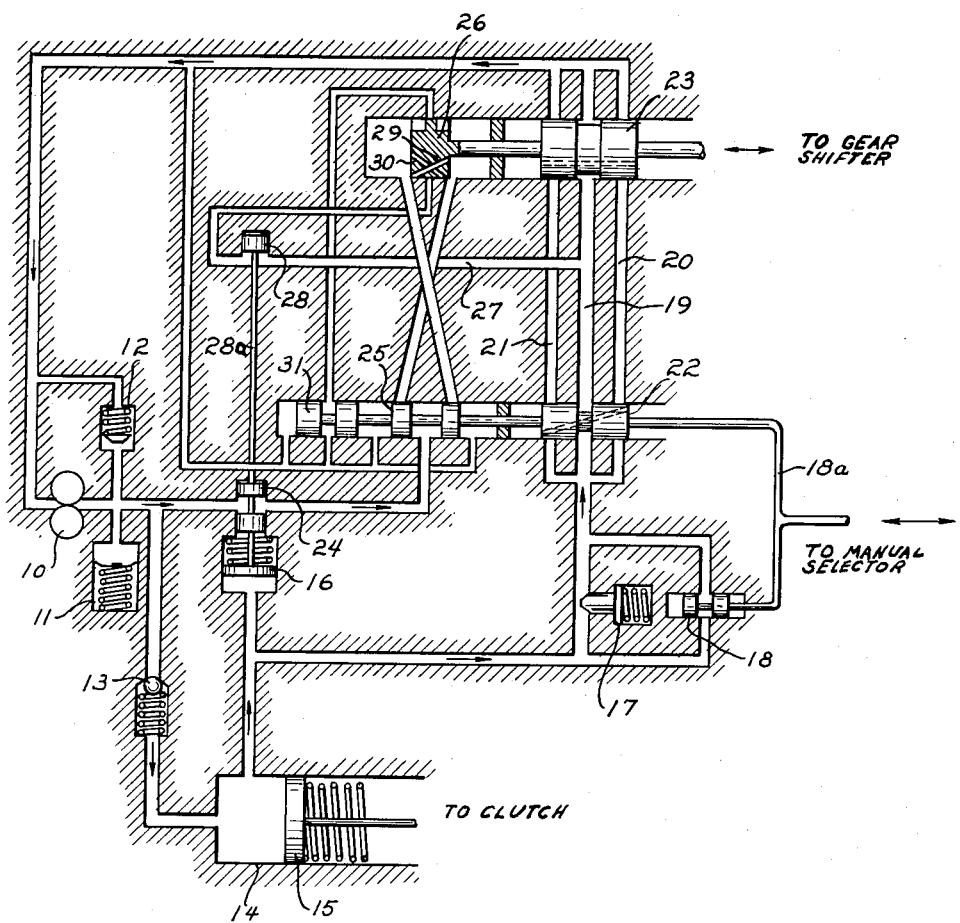
INVENTOR
DAVID P. HARRIS
BY *Scrivener & Parker*
ATTORNEYS

United States Patent Office 2,753,726
Patented July 10, 1956

2,753,726

SEMI-AUTOMATIC HYDRAULIC GEAR CHANGE MECHANISMS

David P. Harris, Moseley, Birmingham, England, assignor to The Austin Motor Company Limited, Birmingham, England Application December 11, 1953, Serial No. 397,703

Claims priority, application Great Britain December 18, 1952

5 Claims. (Cl. 74—334)

This invention relates to semi-automatic hydraulic gear change mechanisms and has for its object to provide an improved mechanism which will enable any number of forward gears in a transmission having a conventional clutch and gear-box to be engaged as the result of movement of a manual selector lever, operation of the clutch being automatic.

According to the invention we provide a semi-automatic hydraulic gear change mechanism, comprising a primary hydraulic circuit including in sequence and in the direction of flow, an engine-driven pump, a single-acting clutch operating cylinder the piston of which is movable against spring-loading for clutch disengagement, a shut-off valve in a secondary hydraulic circuit in parallel with said primary circuit, means controlling operation of said shut-off valve, and alternative parallel flow lines, said secondary circuit incorporating a motor for effecting gear shift and which is also operatively connected to a change-over valve for controlling said alternative parallel flow lines in the primary circuit, and a manually operated valve which selectively opens the alternative parallel flow lines to the change-over valve.

The arrangement is such that in conditions corresponding to "neutral" gear the secondary circuit is closed by the shut-off valve, and free flow conditions obtain in the primary circuit, the change-over valve and the selector valve both being so positioned as to afford an unrestricted passage in one of the parallel flow lines. Manual operation of the selector valve, to select a gear, closes this "neutral" flow line but opens another of the parallel flow lines to the change-over valve, against which valve pressure builds up in the primary circuit. When this pressure reaches a pre-determined value, the spring-loading of the clutch piston is overcome to effect movement of the latter and clutch disengagement. The shut-off valve is then operated to open the secondary circuit to pump delivery, either by being opened when the clutch piston has moved through an appropriate distance, or as continued increase in pressure operates pressure responsive means which in turn open the shut-off valve, whereupon the motor in said circuit is actuated to effect gear shift, which motor actuation also effects movement of the change-over valve into a position corresponding to that of the selector valve and re-establishes free flow conditions in the primary circuit, by opening said other parallel flow line.

Preferably the gear-shift motor is double-acting, so as to be capable of effecting two different gear-shift operations, and the supply of pressure fluid to opposite sides thereof is controlled by a distributing valve, actuable by the selector valve, there being two parallel flow lines in the primary circuit, in addition to the "neutral" flow line, controlled jointly by the selector valve and the change-over valve.

An anti-stalling device operative when starting from rest comprises a flow-restriction valve incorporated in the primary circuit, between the clutch cylinder and the selector valve, which restriction valve is arranged to open progressively, by any suitable means, as engine speed increases from idling speed, and is held open and inoperative at normal road speeds, and a by-pass valve which when open cuts out the restriction valve by opening a by-pass for the primary circuit flow, said by-pass valve being coupled with the selector valve so as to be opened only when the selector valve is in its "neutral" position. Thus at idling speeds when starting from rest, the flow-restriction valve is closed but is by-passed, and when a gear is selected said by-pass valve is closed so that the restriction valve causes a pressure build-up to disengage the clutch, the selected gear being then engaged as above described. The clutch, however, cannot re-engage to take up the drive in the selected and engaged gear until engine speed has been increased sufficiently to open the restriction valve and allow pressure to drop in the primary circuit.

In the embodiment of the invention shown diagrammatically in the accompanying drawing, the primary circuit includes in sequence and in the direction of flow, an engine driven pump 10, the usual accumulator 11 and relief valve 12, a non-return valve 13, a clutch operator 14 with its piston 15 spring-loaded for clutch engagement, a pressure responsive diaphragm 16, a flow-restriction valve 17 spring-loaded toward closed position, and a by-pass valve 18 which when open cuts out the restriction valve 17 from the primary circuit flow. The primary circuit then branches into three alternative parallel flow lines 19, 20 and 21 respectively, and controlling these flow lines jointly are a manually operated selector valve 22, operated through the medium of a selector shaft 18a, and a similar change-over valve 23.

Before the non-return valve 13, a secondary circuit branches off from, and in parallel with, the primary circuit and includes in sequence and in the direction of flow a shut-off valve 24 which is controlled by the pressure responsive diaphragm 16 in the primary circuit, a distributing valve 25 operated by the selector valve 22 and which controls supply to opposite sides of a double-acting piston 26 for effecting gear shift and which also operates the change-over valve 23.

In the diagram all parts are shown under conditions of engine turning over at a normal running speed and "neutral" gear, and in this neutral position both the selector valve 22 and the change-over valve 23 are keeping the flow line 19 open so that free flow conditions obtain in the primary circuit, the secondary circuit being isolated by the closed shut-off valve 24. The operating fluid circulates freely through the clutch cylinder 14 and back to the pump 10, no pressure being applied to the clutch operating piston 15.

When the selector valve is moved manually to the left, the "neutral" flow line 19 is closed by the valve body, but the parallel flow line 21 is open to pump delivery. This flow line 21 is obstructed by the body of the change-over valve 23, so that against said valve a pressure is built up in the primary circuit and consequently in the clutch cylinder, and this causes the piston 15 to move against its spring-loading and effect clutch disengagement. As the fluid pressure reaches a value at which the clutch is fully disengaged, the diaphragm 16 responsive to said pressure opens the shut-off valve 24 so that the secondary circuit receives pump delivery. The non-return valve 13 maintains pressure in the clutch cylinder and ensures that the clutch does not re-engage prematurely due to opening of the valve 24.

The distributing valve 25 has been moved to the left, due to the movement of the selector valve 22, and directs fluid supply to the right hand side of the gear shift piston 26, which therefore moves to the left from its central "neutral" position and engages the selected gear. At the same time the change-over valve is moved to the left and at the end of its travel opens flow line 21, so that free flow conditions are re-established in the primary circuit. The resultant pressure drop allows the clutch piston 15 to return under its spring-loading and engage the clutch, and thereby completes the gear change.

Movement of the selector valve 22 to the right produces a similar sequence of operation, but with flow line 20 being closed and re-opened, and the piston 26 being moved to the right to engage another gear.

When changing from any positive gear back to "neutral" the selector valve 22 is returned manually to the position shown in the drawing, which operation also moves the distributing valve 25 into the position shown, in which it is closing ports leading to both sides of the gear shift piston 26. The latter, however, and its associated change-over valve 23 will still be in the non-central "in gear" position and must be brought back to the "neutral" position shown in the drawing. Since the selector valve 22 is in its "neutral" position it opens flow line 19 to pump delivery, but said line is obstructed by the change-over valve so that pressure builds up in the primary circuit, as above described, and effects clutch disengagement. A branch pressure line 27 connects the flow line 19 with the centre of the cylinder housing the gear shift piston 26, and said branch line 27 contains a shut-off valve 28 which is operated by the pressure responsive diaphragm 16 through the medium of a shaft 28a and for the same purpose, so that after clutch disengagement said valve 28 opens and pressure fluid is supplied to the periphery of the piston 26. Through the body of the latter are provided two oppositely inclined ports 29, 30 respectively, so arranged that if the piston is at the right hand limit of travel in its cylinder, the port 29 will supply pressure fluid to the right hand side of the piston, whilst the port 30 will supply pressure fluid to the left of the piston 26 when the latter is at the left hand limit of its travel exhaust fluid escaping from the appropriate side of the piston through a valve 31, which is arranged to be open only when the selector valve 22 is in the neutral position, and the piston 26 will therefore be returned to the neutral position shown in the drawing as also will the change-over valve 23.

Each positive gear is retained in the engaged position by a spring-loaded detent arrangement, as is conventional in a gear box.

An anti-stalling arrangement is provided which operates when starting from rest and comprises the flow restriction valve 17 in the primary circuit. This valve 17 is arranged to open progressively as engine speed increased from idling speed, and to this end could be governor operated, or alternatively comprise a diaphragm the opposite sides of which are subjected respectively to pump delivery side and return side pressures, or be operated in any other suitable way. A by-pass valve 18 is coupled with the manual operating means 18a of the selector valve 22 opened only when the selector valve is in its "neutral" position, but when said valve 22 is moved from said neutral position the valve 18 is immediately closed. Thus at idling speeds in "neutral" the restriction valve 17 is closed but bypassed by the valve 18 so that free flow conditions obtain in the primary circuit and the clutch is engaged.

When a gear is selected by moving the selector valve 22, the valve 18 is closed and pressure builds up against the restriction valve 17 which is also closed at idling speeds. Normally the clutch piston is operated to disengage the clutch and the gear engaged as previously described, but not so long as idling speed only obtains, because the valve 17 remains closed, pressure is maintained in the primary circuit, and the clutch cannot re-engage to take up the drive. Engine speed must be increased above idling to restore free flow conditions in the primary circuit and re-engage the clutch, and therefore stalling when starting from rest cannot occur. At normal road speeds in any gear the valve 17 will be open and inoperative, and the hydraulic accumulator 11 enables the "neutral" position of the gear shift piston 26 and change-over valve 23 to be re-established if the engine stalls in gear. It will be seen that the pump 10 demands no power from the engine except during an actual gear change.

It will be appreciated that in any application where there are more than two forward gears to be selected and engaged, the same gear shift piston effects all necessary gear changes through the medium of a conventional cross-shift gear box mechanism.

Having fully described my invention, what I claim and desire to secure by Letters Patent is:

1. A semi-automatic hydraulic shift mechanism for gears of the type having a clutch for disengaging a driving engine from said gears during the shifting thereof comprising a primary circuit including in sequence and direction of flow an engine-driven pump, a cylinder, and alternative parallel flow lines; a secondary circuit connected in parallel with said primary circuit and including in sequence a shut-off valve and a motor operatively connected to said gears for effecting shifts thereof; a single acting piston in said cylinder operatively connected to said clutch and spring biased to clutch engaged position; means for controlling said shut-off valve in said secondary circuit, a change-over valve in said primary circuit operatively connected to said motor for controlling the flow of fluid through said alternative flow lines, and a manually operated selector valve movable between a "neutral" gear and gear engaged positions to selectively open the alternative parallel flow lines to admit the passage of fluid therethrough to said change-over valve, the arrangement being such that in conditions corresponding to "neutral" gear the secondary circuit is closed by the shut-off valve, and free flow conditions obtain in the primary circuit with the change-over and selector valves both positioned to afford an unrestricted passage in one of the parallel flow lines, manual operation of the selector valve to a gear engaged position closing said first flow line and opening another thereof to the change-over valve against which pressure builds up in the primary circuit and there is effected, in sequence, actuation of the clutch piston for clutch disengagement, actuation of the shut-off valve control means to open said valve in the secondary circuit, actuation of the gearshift motor in said secondary circuit, which motor actuation also effects movement of the change-over valve to a position corresponding to that of the selector valve and re-establishes free flow conditions in the primary circuit.

2. The semi-automatic hydraulic shift mechanism for gears of claim 1 wherein the means for controlling said shut-off valve comprises an operative connection between said clutch operating piston and said shut-off valve whereby said valve is opened when the piston has moved an appropriate distance for clutch disengagement.

3. The semi-automatic hydraulic shift mechanism for gears of claim 1 wherein the means for controlling said shut-off valve comprises a pressure responsive diaphragm operatively connected with said shut-off valve for opening the same at a predetermined pressure.

4. A semi-automatic hydraulic shift mechanism for gears of the type having a clutch for disengaging a driving engine from said gears during the shifting thereof comprising: a primary hydraulic circuit including in sequence and in the direction of flow, an engine-driven pump, a cylinder and three parallel flow lines; a secondary circuit connected in parallel to said primary circuit and including in sequence a shut-off valve and a double-acting piston operatively connected to said gears for shifting the same, a single-acting piston in said cylinder in said primary circuit operatively connected to said clutch and spring-biased to clutch engaged position, pressure responsive means in said primary circuit for controlling the shut-off valve in said secondary circuit, a distributing valve in said secondary circuit for controlling supply of fluid pressure to opposite sides of said gearshift piston, a manually operable selector valve in the primary circuit movable between a "neutral" gear position and gear engaged positions for controlling said three parallel flow lines, means interconnecting said selector valve and distributing valve for simultaneous actuation, and a change-over valve in said primary circuit for controlling the passage of fluid pressure through flow lines and operatively connected with said gearshift piston for actuation thereby, the arrangement being such that in conditions corresponding to "neutral" gear the secondary circuit is closed by the shut-off valve, and free flow conditions obtain in the primary circuit with the change-over and selector valves both positioned to afford an unrestricted passage in one of the parallel flow lines, manual operation of the selector valve to a gear-engaged position closing the first flow line and opening another thereof to the chang-over valve against which pressure builds up in the primary circuit and there is effected, in sequence, actuation of the clutch piston for clutch disengagement, opening of the shut-off valve in the secondary circuit, actuation of the gearshift motor in said secondary circuit, which motor actuation also effects movement of the change-over valve to a position corresponding to that of the selector valve and re-establishes free flow conditions in the primary circuit.

5. A semi-automatic hydraulic shift mechanism for gears according to claim 4, and including an anti-stalling device, operative when starting, which comprises a flow-restriction valve in the primary circuit between the clutch cylinder and the selector valve, means for opening said valve progressively as engine speed increases from idling and holding said valve open and inoperative at normal engine speeds, a by-pass valve which when open cuts out said restriction valve by opening a by-pass for the primary circuit flow, and means coupling said by-pass valve with the selector valve so that the by-pass valve is open only when the selector valve is in its "neutral" position.

References Cited in the file of this patent
UNITED STATES PATENTS

| | | |
|---|---|---|
| 2,062,104 | Prince | Nov. 24, 1936 |
| 2,235,943 | Mylius | Mar. 25, 1941 |
| 2,239,182 | Werder | Apr. 22, 1941 |
| 2,536,462 | Price | Jan. 2, 1951 |
| 2,620,667 | Flinn | Dec. 9, 1952 |